United States Patent
Gillet

(10) Patent No.: US 7,624,833 B2
(45) Date of Patent: Dec. 1, 2009

(54) SEAT-BELT PRETENSIONER ARRANGEMENT

(75) Inventor: Christophe Gillet, Levis Saint Norn (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/868,761

(22) Filed: Oct. 8, 2007

(65) Prior Publication Data

US 2008/0033616 A1 Feb. 7, 2008

Related U.S. Application Data

(63) Continuation of application No. PCT/SE2006/000403, filed on Apr. 4, 2006.

(30) Foreign Application Priority Data

Apr. 7, 2005 (GB) ................................. 0507089.1

(51) Int. Cl.
*B60R 22/405* (2006.01)
(52) U.S. Cl. ........................... 180/268; 701/45; 280/806
(58) Field of Classification Search ................. 180/268, 180/271, 282; 280/806; 701/45
See application file for complete search history.

(56) References Cited

U.S. PATENT DOCUMENTS

| | | | | |
|---|---|---|---|---|
| 5,552,986 | A * | 9/1996 | Omura et al. ................... 701/45 |
| 5,605,202 | A * | 2/1997 | Dixon ......................... 180/268 |
| 5,788,281 | A * | 8/1998 | Yanagi et al. ............... 280/806 |
| 6,257,363 | B1 | 7/2001 | Midorikawa |
| 6,363,306 | B1 | 3/2002 | Palmertz et al. |
| 6,394,495 | B1 * | 5/2002 | Specht ....................... 280/806 |
| 6,626,463 | B1 * | 9/2003 | Arima et al. ................. 280/806 |
| 6,726,249 | B2 * | 4/2004 | Yano et al. .................. 280/805 |
| 6,766,875 | B2 | 7/2004 | Yamamoto |
| 6,846,019 | B2 * | 1/2005 | Tobata ........................ 280/806 |
| 6,908,112 | B2 * | 6/2005 | Yano et al. .................. 280/805 |
| 7,057,503 | B2 | 6/2006 | Watson |
| 7,107,136 | B2 * | 9/2006 | Barta et al. .................... 701/70 |
| 7,138,938 | B1 * | 11/2006 | Prakah-Asante et al. ....... 342/70 |
| 7,178,622 | B2 * | 2/2007 | Eberle et al. ................. 180/271 |
| 7,246,822 | B2 * | 7/2007 | Stanley ....................... 280/806 |
| 7,370,721 | B2 * | 5/2008 | Zelmer et al. ............... 180/269 |
| 2001/0025735 | A1 | 10/2001 | Midorikawa |
| 2002/0010541 | A1 | 1/2002 | Houston et al. |
| 2002/0024211 | A1 * | 2/2002 | Yano et al. .................. 280/806 |
| 2002/0147535 | A1 * | 10/2002 | Nikolov ....................... 701/45 |

(Continued)

FOREIGN PATENT DOCUMENTS

EP 1 445 155 A1 8/2004

(Continued)

*Primary Examiner*—Paul N Dickson
*Assistant Examiner*—Karen Jane J Amores
(74) *Attorney, Agent, or Firm*—Brinks Hofer Gilson & Lione

(57) ABSTRACT

A seat-belt pretensioner arrangement includes a pretensioner configured to apply at least two tension levels to a seat-belt and a control system to control the pretensioner. A control system is configured to provide at least one vehicle slip function which is derived from at least one sensed parameter relating to the current or expected dynamic situation of the vehicle. The control system is configured to select the tension level to be applied to the seat-belt by the pretensioner in response to the value of the slip function provided by the control system.

14 Claims, 3 Drawing Sheets

U.S. PATENT DOCUMENTS

| | | |
|---|---|---|
| 2003/0173131 A1 | 9/2003 | Midorikawa et al. |
| 2003/0182041 A1 | 9/2003 | Watson |
| 2004/0056471 A1 | 3/2004 | Bullinger |
| 2004/0064246 A1* | 4/2004 | Lu et al. .................. 701/124 |
| 2004/0080204 A1 | 4/2004 | Enomoto et al. |
| 2004/0084890 A1* | 5/2004 | Tobata ..................... 280/806 |
| 2004/0104570 A1 | 6/2004 | Midorikawa et al. |
| 2004/0195030 A1* | 10/2004 | Eberle et al. .............. 180/271 |
| 2004/0254710 A1 | 12/2004 | Yano |
| 2005/0017494 A1 | 1/2005 | Midorikawa |
| 2005/0065688 A1 | 3/2005 | Rao et al. |
| 2005/0077717 A1 | 4/2005 | Midorikawa |
| 2005/0149240 A1* | 7/2005 | Tseng et al. ................ 701/38 |
| 2005/0252710 A1* | 11/2005 | Akaba et al. .............. 180/268 |
| 2006/0089771 A1* | 4/2006 | Messih et al. ................ 701/45 |
| 2006/0108787 A1* | 5/2006 | Czaykowska et al. ....... 280/806 |
| 2007/0163832 A1 | 7/2007 | Midorikawa |
| 2007/0228713 A1 | 10/2007 | Takemura |
| 2007/0276566 A1* | 11/2007 | Diebold et al. ............... 701/45 |
| 2008/0033616 A1 | 2/2008 | Gillet |
| 2008/0071446 A1 | 3/2008 | Brauner et al. |
| 2008/0077289 A1 | 3/2008 | Fujishima |

FOREIGN PATENT DOCUMENTS

| | | | |
|---|---|---|---|
| EP | 1 486 382 A2 | | 12/2004 |
| GB | 2 372 822 B | | 11/2002 |
| WO | WO 2004/005050 | * | 1/2004 |
| WO | WO 2004/065182 A1 | | 8/2004 |

* cited by examiner

SEAT-BELT PRETENSIONER ARRANGEMENT

CROSS REFERENCE TO RELATED APPLICATIONS

This application claims priority to PCT/SE2006/000403 filed Apr. 4, 2006 and GB Patent Application No. 0507089.1 filed Apr. 7, 2005.

FIELD OF THE INVENTION

This invention relates to a seat-belt pretensioner arrangement, and more particularly relates to a seat-belt pretensioner arrangement for use in a vehicle, such as a motor car to apply a tension to a seat-belt to reduce the risk of injury to a seat occupant in an accident situation.

BACKGROUND OF THE INVENTION

It has been proposed previously to provide seat-belt pretensioners which apply a tension to a seat-belt in the event that an accident occurs. Many pre-tensioners of this type are actuated by a pyrotechnic charge, which generates gas to move a piston within a cylinder. The piston applies tension to a wire which is wound round the spindle of a seat-belt retractor so that seat-belt is wound into the retractor, thus tightening the seat-belt across the lap and chest of a person wearing the seat-belt. Other pretensioners may move the entire retractor relative to its mounting, or may move an end part of the seat-belt, or a guide through which the seat-belt passes, or may move the seat-belt buckle, relative to a mounting. The action of the pretensioner is to ensure that the seat-belt can provide an optimum retaining effect, thus effectively retaining the person wearing the seat-belt in their seat during the accident situation and minimizing the risk of the person wearing the seat-belt moving from their position in their seat to impact with another part of the vehicle, such as a steering-wheel or dashboard.

U.S. Pat. No. 6,394,495 discloses a seat-belt tightener which has an electrical tightening device that can be operated in response to sensor signals generated by sensors which evaluate various parameters relating to the vehicle in which the arrangement is fitted. The electrical tightening device can generate a "soft" tightening profile with a relatively low seat-belt tension, or alternatively can generate a "hard" tightening profile with a higher pulling force, which gives a higher seat-belt tension. The soft tightening profile is chosen when the vehicle exhibits certain handling characteristics such as an excessive lateral acceleration, or excessive yaw angle speed or yaw angle acceleration. On the other hand the hard tightening profile is selected when other indicating signals, such as signals from a brake pressure meter, which determines the severity of braking, are higher than an assigned threshold value.

Thus the soft tightening profile is selected in response to signals from specific groups of sensors and the hard tightening profile is selected in response to signals from other groups of sensors.

Accordingly, there is a need to provide an improved seat-belt pretensioner arrangement.

SUMMARY OF THE INVENTION

In at least one embodiment, the present invention provides a seat belt pretensioner arrangement comprising a pretensioner configured to apply at least two tension levels to a seat-belt and a control system to control the pretensioner. The control system is configured to provide at least one vehicle slip function which is derived from at least two sensed parameters relating to the current or expected slip situation of the vehicle. The control system is configured to select the tension level to be applied to the seat-belt by the pretensioner in response to the value of the slip function which is provided by the control system.

In one aspect, the control system includes at least one processor to process signals from two or more sensors to generate a slip function.

In another aspect, the arrangement includes one or more sensors to sense parameters related to slip.

In yet another aspect, the sensors sense parameters selected from longitudinal velocity, lateral acceleration, angular velocity (yaw), and steering angle.

In still another aspect there is a processor to generate a function indicative of over-steer/under-steer of the vehicle.

In another aspect there is a processor to generate a function indicative of body slip of the vehicle.

In yet another aspect there is a said processor to generate a function indicative of evasive maneuvering of the vehicle.

In still another aspect, the function indicative of evasive maneuvering is a function of axial velocity, steering angle and rate of change of steering angle. (Steering angular velocity).

In one aspect there is a processor to generate a function indicative of high speed cornering of the vehicle.

In another aspect there is a discriminator to select one out of a plurality of slip functions.

In yet another aspect, the at least one slip function is selected from over-steer/under-steer, body slip, evasive maneuvering and high speed cornering. When a plurality slip functions are to be used some or all of these slip functions may be present.

In one embodiment there is a discriminator to select one out of a plurality of slip functions.

In one aspect there are at least three thresholds.

In at least one other embodiment, the control system includes a comparator configured to compare the said slip function with a first threshold and to provide an output when said first threshold is exceeded with the output then rising in a predetermined manner in response to any further increase in the value of the function. The control system is configured to control the pretensioner to increase the tension in the seat-belt in response to said output.

In one aspect, the comparator rises smoothly with a smooth increase in the function. The control system is configured to control the pretensioner to increase the tension in the seat-belt smoothly in response to said smooth output.

In another aspect, the control system is configured to maintain a maximum applied tension in the seat-belt until a predetermined period of time has elapsed after the function has fallen below said at least one threshold.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
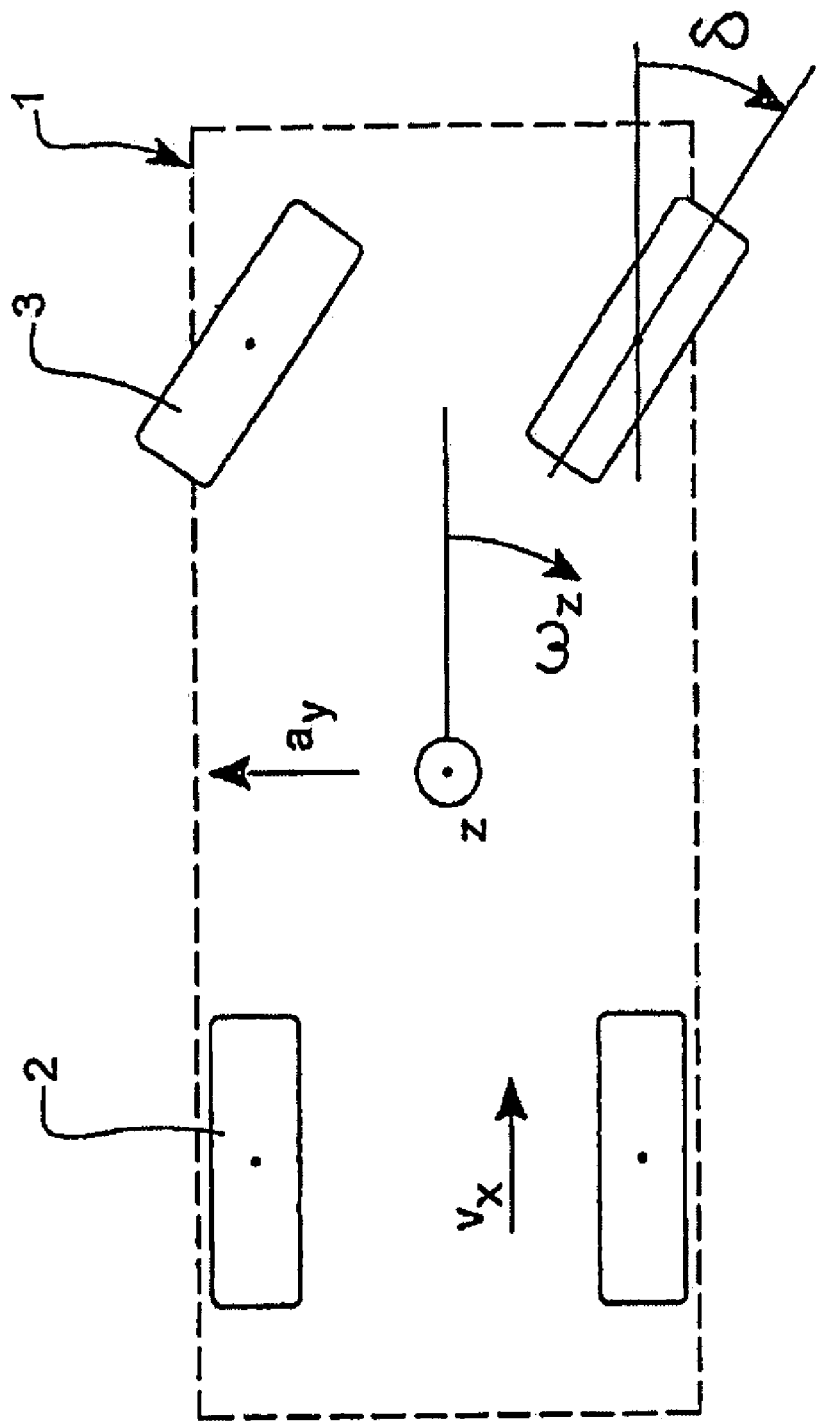
FIG. 1 is a plan view of a motor car indicating various parameters to be sensed to control a safety-belt retractor.

Referring initially to FIG. 1, a motor vehicle 1 is shown schematically, the vehicle 1 having a pair of rear wheels 2 and a pair of front wheels 3. FIG. 1 illustrates various parameters which may be sensed in one embodiment of the invention. The vehicle may have a longitudinal velocity $v_x$ which is the normal speed of the vehicle. The vehicle may also have a lateral acceleration $a_y$, and such an acceleration may be generated in a side impact situation or, alternatively, if the vehicle makes a sharp or high speed turn. The vehicle may have an angular velocity about a vertical axis z passing through the centre of the vehicle, $\omega_z$. This angular rotation may be termed "yaw".

Also, the vehicle has, at any instant, a "steering angle", the steering angle δ, being the angle between the rolling direction of the front wheels 3 of the vehicle and the longitudinal axis of the vehicle.

The vehicle 1 may be subjected to a lateral or side slip situation when the front wheels 3 and/or the real wheels 2 are slipping in a lateral direction, for instance as a result of under-steering or over-steering of the vehicle 1. A slip situation also occurs when the vehicle 1 is subjected to body slip, whereby the body of the vehicle 1 slips in a lateral direction.

Figure 2:
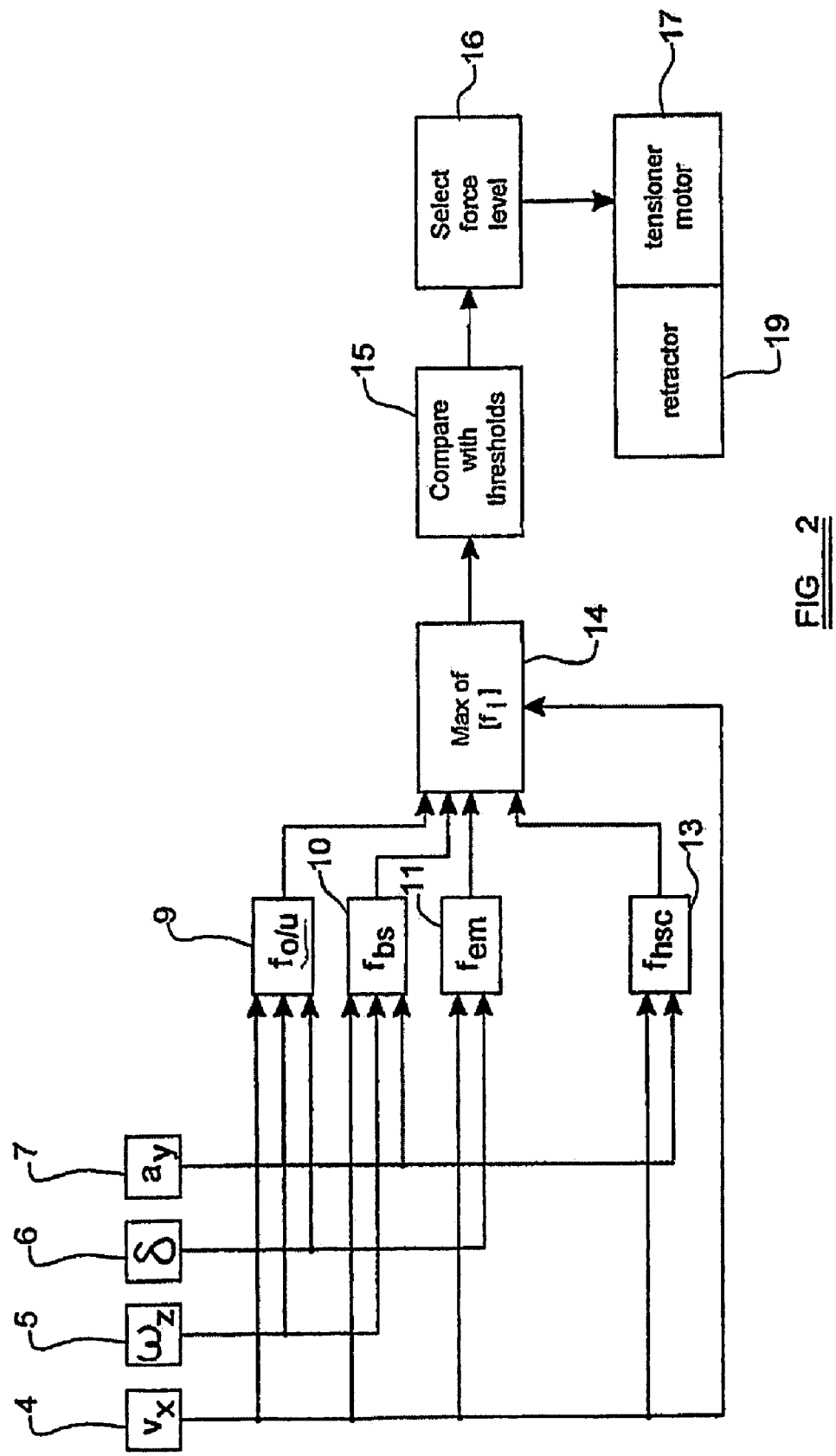
FIG. 2 is a block diagram illustrating a seat-belt pretensioner arrangement having various sensors, and associated processing circuitry together with a retractor.

FIG. 2 illustrates a plurality of sensors which are provided to sense the various parameters identified with reference to FIG. 1. A sensor 4 is provided to sense longitudinal velocity $v_x$. A sensor 5 is provided to determine the angular velocity $\omega_z$ (or "yaw") about the vertical axis z. A sensor 6 is provided to determine the steering angle δ. A sensor 7 is provided to determine lateral acceleration $a_y$.

The signals from various combinations of sensors are passed to a central system in which the signals are processed by processors to produce outputs representative of various "handling conditions" or "vehicle dynamic severity conditions" of the vehicle. Thus, effectively the signals are processed to determine how the vehicle is being driven, whether slowly or quickly, whether cornering or straight, whether with sharp or high speed corners, to enable a determination to be made of whether there is a risk or probability of an accident occurring.

A processor 9, for example, determines a function ($f_{o/u}$) of $v_x$, $\omega_z$ and δ, the function ($f_{o/u}$) being a function which indicates the degree of over-steer or under-steer. Thus, the processor 9 performs a complex process on the inputs that it receives from three of the sensors, namely the sensors 4, 5 and 6 as described above, to produce an output which is effectively indicative of the degree of under-steer or the degree of over-steer. It is to be understood that the output indicative of the degree of under-steer or over-steer is to be used to indicate the degree of lateral slip of the vehicle 1.

Similarly the processor 10 determines a function ($f_{bs}$) of $v_x$, $\omega_z$ and $a_y$, the function ($f_{bs}$) being a function which indicates the degree of body slip. Thus the processor 10 performs a complex process on the input that it receives from three of the sensors, namely the sensors 4, 5 and 7 to produce an output which is, effectively, an indication of the degree of side slip of the vehicle.

Similarly, the processor 11 determines a function ($f_{em}$) of $v_x$ and δ, the function ($f_{em}$) being in the form which indicates the degree of evasive maneuvering of the motor vehicle. The function is actually a function which involves not only δ, but the first differential of δ with regard to time, that differential being determined within the processor 11. Thus the processor 11 forms a complex process on the inputs that it receives from two of the sensors, namely the sensors 4 and 6 to provide an output which is an effective indication of the degree of evasive maneuvering being performed. The degree of evasive maneuvering is related to the lateral slip of the vehicle 1, and it is to be understood that the output indicative of the degree of evasive maneuvering is to be used to indicate the expected slip of the vehicle 1.

The processor 13 determines a function ($f_{hsc}$) of $v_x$ and $a_y$, the function ($f_{hsc}$) being in a form which indicates high speed cornering of the vehicle. Thus the processor 13 performs a complex process on the input that it receives from two of the sensors, namely the sensors 4 and 7, to produce an output which is effectively an indication of the degree of high speed cornering that is being experienced by the vehicle. If the vehicle 1 is experiencing high speed cornering the vehicle 1 may undergo lateral slip and it is to be understood that the output from the sensors 4 and 7 which is indicative of the degree of high speed cornering is to be used to indicate the expected slip of the vehicle 1.

The arrangement as described, thus produces a plurality of signals, each of which are indicative of a "handling condition" or a "slip condition" of the vehicle. The signals have a low value when the vehicle is being driven slowly and carefully, and a high value when the vehicle is being driven in a potentially dangerous manner.

In the described embodiment of the invention all of the outputs of the processors 9 to 13 are provided to a discriminator 14. The discriminator 14 effectively determines which of the input signals from the processors 9 to 13 has the highest absolute value $|f_i|_{max}$ and transfers that signal to a comparator 15. The discriminator 14 produces an output which is the absolute value of the function ($f_i$), that is to say the numerical value of the function regardless of whether the numerical value is positive or negative. Alternatively the discriminator 14 may combine the signals from the various processors 9 to 13, to provide a complex function which indicates the degree of lateral slip or the expected degree of lateral slip of the vehicle 1 which is also indicative of overall probability or risk of an accident occurring. In determining the complex function other data may be used than simply the outputs for the processors 9 to 13, such as, for example, the speed of the vehicle as sensed by the sensor 4.

The output of the discriminator 14 is provided to a comparator 15. The comparator 15 includes at least one threshold. The purpose of the comparator 15 is to provide an output when the function from the discriminator 14 exceeds a first threshold, and also to respond to a further increase in the function. Thus, there are, in this example, five incremental thresholds in the comparator 15. Any number of thresholds may be provided, with the minimum preferred value being three thresholds. The greater the number of thresholds, the increased "smoothness" with which tension is applied to the seat-belt.

There may, for example, be five incremental thresholds. The output of the comparator is provided to a force level selector 16. The force level selector 16 controls an electric motor 17 which is incorporated within a seat-belt retractor 19, to wind-in seat-belt until a predetermined tension is achieved. Thus, the tension in the seat-belt is increased when the first threshold is crossed, and is also increased in response to each of a plurality of further increases in the function, as each of the remaining four thresholds are passed. Thus the seat-belt is tensioned by the retractor in response to the magnitude of the function, with the level of tension increasing with an increasing value of the function ($f_i$).

The processors 9 to 13, the discriminator 14, the comparator 15 and the selector 16 together form a control system to control the pretensioner. The control system generates a plurality of slip functions from a plurality of sensed parameters. The tension level applied to the seat-belt is selected in response to the value of the largest of the functions.

Whilst, in the described embodiment, there is a comparator with specific thresholds, in a modified embodiment of the invention the force level selector can be configured to select a force level or tension in the seat-belt which is directly proportional to the magnitude of the function, once the function has exceeded a first lower threshold, with the seat-belt tension thus rising smoothly until a maximum tension is obtained rather than in a step-wise fashion.

Whilst, as thus far described, the control function is exerted through the medium of a function selected from a plurality of functions derived from a plurality of processors, each of which effectively generates a signal indicative of a particular slip function or handling characteristic of a vehicle, it is possible to use a system with only one of the described processors. Thus, if only the processor 9 is used, the output of the processor 9, which indicates the degree of over-steer or under-steer, is passed directly to the comparator 15 which compares the degree of under-steer and over-steer with a plurality of thresholds (as will be described further with reference to FIG. 3) and which passes a signal to the force level selector 16 to cause the retractor to be tensioned.

At this stage it is to be appreciated that the various sensors will sense parameters which are not directly related to an accident situation, but, by sensing the parameters, it is possible to determine when an accident is likely to occur, and, taking into account parameters such as the velocity of the vehicle $v_x$ at that instant, it is possible to determine the probable severity of the accident. In response to these calculations, the seat-belt may be retracted into the retractor. If the situation is such that there is a low risk of the vehicle going out of control, then the seat-belt may be tensioned gently. This will begin to place the seat-belt in an optimum condition to provide a desired degree of protection to the person utilizing the seat-belt should an accident occur, but also the slight tightening of the seat-belt may well act as a warning, especially to the driver of the vehicle, that the vehicle is being driven in a manner which may cause an accident to occur. This slight or soft tightening of the seat-belt will not be such that there is any risk of the seat-belt itself providing discomfort to or injuring the person using the seat-belt. This gentle tightening of the seat-belt may help to hold a person in their seat if, for example, the vehicle corners violently. If the operation of the processors 9 to 13 are such that the function ($f_i$) selected by the discriminator 14 exceeds the threshold in the comparator 15 and is indicative that a serious or "high energy" accident is about to occur, then the seat-belt may be tensioned, by the retractor, to a higher degree, which may provide some slight discomfort to the person wearing the seat-belt, but which will ensure that the seat-belt is in the optimum condition for providing protection to the person wearing the seat-belt should the anticipated severe accident occur.

Figure 3:
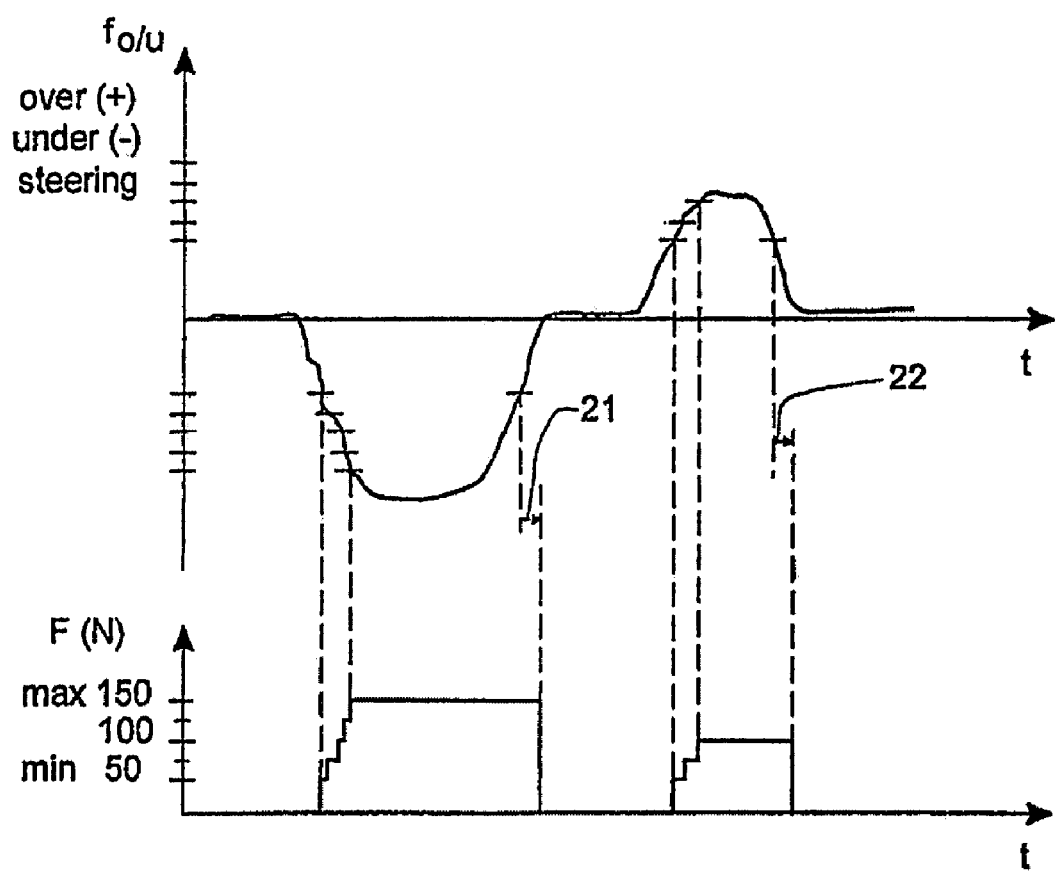
FIG. 3 is a graphical figure provided for purposes of explanation.

Referring now to FIG. 3, the upper graphical figure is a graph showing, for example, the output of the processor 9, that is to say the processor that provides the function ($f_{o/u}$) which indicates the degree of over-steering or under-steering. The graph shows five predetermined thresholds for under-steer and over-steer. It can be seen that initially there is a substantial degree of under-steer. As the degree of under-steer exceeds the first threshold, the tensioner motor 17 is actuated to wind in seat-belt until there is a tension F, and it can be seen that the tension in the safety-belt is 50 N. Subsequently the second threshold is crossed, and the tension rises to 75 N. As the third threshold is crossed the tension rises to 100 N and as the fourth and fifth thresholds are crossed the applied force rises to 125 and 150 N respectively. The degree of under-steer continues to increase, but the maximum tension of 150 N is maintained.

As the degree of under-steer reduces, the various thresholds are passed, until finally the first threshold is passed. The maximum tension is maintained, however, as all of these thresholds are passed and then for an additional predetermined period of time, as indicated by the short arrow 21. This is to ensure that tension is not released prematurely in a complex accident situation.

Subsequently there is a period of over-steer and as the first threshold is passed again a force 50 N is applied, with forces of 75 and 100 N being applied as the second and third thresholds are passed. In this part of the graph the fourth and fifth thresholds are not passed. Again, the maximum tension generated in the seat-belt is maintained until the degree of over-steer reduces to fall beneath the first threshold, and also for a further additional period of time indicated by the arrow 22 before the applied force is released.

Figure 4:
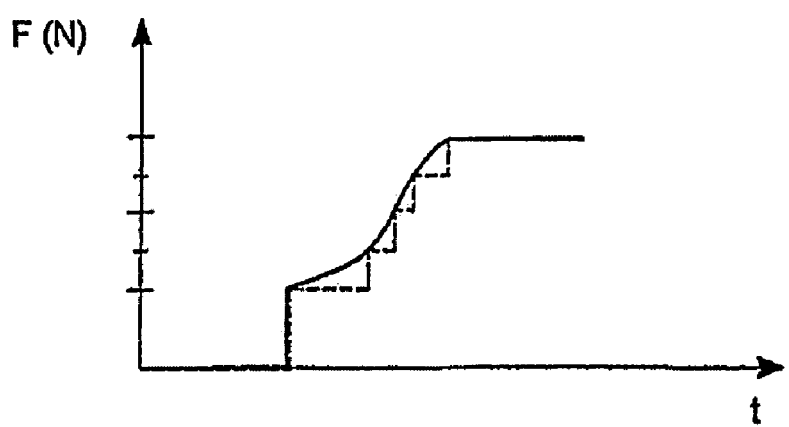
FIG. 4 is another graphical figure provided for purposes of explanation.

It is to be appreciated from FIG. 3 that the tension in the seat-belt increases with incremental step increases as each threshold is passed. It is possible in a modified embodiment of the invention for the tension to be applied in a "smoother" manner with the initial "soft" tension in the seat-belt being applied, once a first threshold has been exceeded. In such an embodiment the selector 16 may provide an output when a first threshold is exceeded, the output of the selector then rising in a predetermined manner in response to any further rise in the value of the function. Thus the tension in the seat-belt may be effectively proportional to the magnitude of the relative function until a second threshold or maximum possible applied force has been achieved. The applied force will then be maintained at the maximum level again until a predetermined period of time has elapsed following the reduction in the function to a level beneath the first threshold. This is illustrated in solid lines in FIG. 4, with the corresponding "step" function being shown in dotted lines.

In operation of at least one embodiment of the invention soft and early actuation of the tensioner may be achieved to give support in situations which are not really "accident" situations, but in which the vehicle is being handled in an erratic manner. This may serve to warn the driver of a potential accident situation. Whilst various sensors have been described, it is to be appreciated that in other embodiments of the invention other sensors may be used. Sensor signals may be acquired from sensors which form part of an ESP (Electronic Stability Programme), and from sensors which form part of an ABS (Anti-Lock Braking System).

It is to be understood that because an electric motor is used to tension the seat-belt in the retractor, the motor may release tension easily, when circumstances permit, and is immediately ready for re-use, in contrast to pretensioners which utilize pyrotechnic charges to generate gas to operate the pretensioner.

A retractor that forms part of an embodiment of the invention may additionally be provided with a conventional pretensioner actuated by a pyrotechnic charge, responsive to an accident sensor, to be actuated in case an accident should occur which is not sensed by sensors described above.

Whilst the invention has been described with reference to embodiments in which the pretensioner is incorporated into a retractor, other types of pretensioner may be used.

In at least another embodiment of the invention, the control system may be configured so that whenever the seat-belt is in use and the vehicle is in use, tension will be applied to the seat-belt by the tensioner motor 17, so that the seat-belt is not "slack" but gently restrains a seat occupant within the seat. In an embodiment of this type, the tension applied to the seat-belt by the tensioner motor will increase, under the control of the control system, in response to a potential "accident" situation, as described above.

As a person skilled in the art will readily appreciate, the above description is meant as an illustration of implementation of the principles of this invention. This description is not intended to limit the scope or application of this invention in that the invention is susceptible to modification, variation and change, without departing from the spirit of the invention, as defined in the following claims.

The invention claimed is:

1. A seat belt pretensioner arrangement for a vehicle, the arrangement comprising a pretensioner configured to apply at least two tension levels to a seat-belt and a control system for controlling the pretensioner, wherein the control system is configured to provide at least one slip function which is derived from at least two sensed parameters relating to a wheel slip condition of the vehicle, the control system further being configured to compare the at least one slip function with a first threshold and a second threshold corresponding to a degree of wheel slip greater than the first threshold, wherein the control system is configured to select a first tension level to be applied to the seat-belt by the pretensioner in response to a value of the slip function exceeding the first threshold, wherein the control system is configured to select a second tension level greater than the first tension level to be applied to the seat-belt by the pretensioner in response to the value of the slip function exceeding the second threshold, the control system including a comparator configured to compare the at least one slip function with the first threshold and a plurality of successively increasing thresholds corresponding to successively increasing degrees of wheel slip, the second threshold being the maximum threshold of the plurality of successively increasing thresholds, the comparator further being configured to provide an output when a value of the slip function exceeds any of the first threshold and the plurality of thresholds, wherein the output increases in response to an increase in the value of the slip function, the control system being configured to control the pretensioner to increase the first level of tension in the seat-belt in response to the increasing output, the first level of tension being proportional to the value of the slip function and hence the output of the comparator.

2. The arrangement according to claim 1 wherein the control system includes at least one processor for processing signals from a plurality of sensors to generate the slip function.

3. The arrangement according to claim 2 wherein at least two of the sensors sense parameters related to the wheel slip condition.

4. The arrangement according to claim 3 wherein the sensors sense two or more parameters selected from the group consisting of longitudinal velocity ($v_x$), lateral acceleration ($a_y$), angular velocity (yaw) ($\omega_z$), and steering angle ($\delta$).

5. The arrangement according to claim 2 wherein the processor generates a function ($f_{o/u}$) indicative of slip conditions in the form of over-steer or under-steer of the vehicle.

6. The arrangement according to claim 2 wherein the processor generates a function ($f_{bs}$) indicative of the wheel slip of the vehicle.

7. The arrangement according to claim 2 wherein the processor generates a function ($f_{em}$) indicative of evasive maneuvering of the vehicle.

8. The arrangement according to claim 7 wherein the function ($f_{em}$) indicative of evasive maneuvering is a function of axial velocity ($v_x$), steering angle ($\delta$) and rate of change of steering angle ($\dot{\delta}$).

9. The arrangement according to claim 2 wherein the processor generates a function ($f_{hsc}$) indicative of high speed cornering of the vehicle.

10. The arrangement according to claim 2 wherein the control system includes a discriminator for selecting one out of a plurality of the slip functions generated by the at least one processor.

11. The arrangement according to claim 1 wherein the at least one slip function is selected from a group consisting of over-steer, under-steer, body slip, evasive maneuvering and high speed cornering.

12. The arrangement according to claim 1 wherein the output of the comparator increases smoothly in response to an increase in the value of the slip function, the control system being configured to control the pretensioner to increase the first level of tension in the seat-belt smoothly in response to the smoothly increasing output.

13. The arrangement according to claim 1 wherein the control system is configured to maintain one of the first and second tension levels applied to the seat-belt until a predetermined period of time has elapsed after the slip function has fallen below one of the corresponding first and second thresholds.

14. A seat belt pretensioner arrangement for a vehicle, the arrangement comprising a pretensioner configured to apply at least two tension levels to a seat-belt and a control system for controlling the pretensioner, the control system including at least one processor to process signals from two or more sensors which sense parameters related to a wheel slip situation of the vehicle to generate a plurality of slip functions, the control system including a discriminator for selecting one out of the plurality of slip functions where the slip functions are selected from a group consisting of over-steer/under-steer, body slip, evasive maneuvering and high speed cornering, the control system further being configured to select the tension level to be applied to the seat-belt by the pretensioner in response to a value of one the slip functions provided by the control system, the control system including a comparator configured to compare at least one slip function with a first threshold and a plurality of successively increasing thresholds corresponding to successively increasing degrees of wheel slip, the comparator further being configured to provide an output when a value of the slip function exceeds any of the first threshold and the plurality thresholds, wherein the output increases smoothly in response to an increase in the value of the slip function, the control system being configured to control the pretensioner to increase the first level of tension in the seat-belt smoothly in response to the smoothly increasing output, the first level of tension being proportional to the value of the slip function and hence the output of the comparator.

* * * * *

UNITED STATES PATENT AND TRADEMARK OFFICE
CERTIFICATE OF CORRECTION

PATENT NO. : 7,624,833 B2 Page 1 of 1
APPLICATION NO. : 11/868761
DATED : December 1, 2009
INVENTOR(S) : Christophe Gillet It is certified that error appears in the above-identified patent and that said Letters Patent is hereby corrected as shown below:

IN THE CLAIMS

In column 7, line 62, claim 5, after "of" insert --the--.

In column 8, line 19, claim 11, after "one" insert --wheel--.

Signed and Sealed this

Thirty-first Day of August, 2010

David J. Kappos
*Director of the United States Patent and Trademark Office*